Feb. 10, 1925.　　　　　N. J. SMITH　　　　1,525,669
FISHING REEL
Filed Sept. 16, 1924
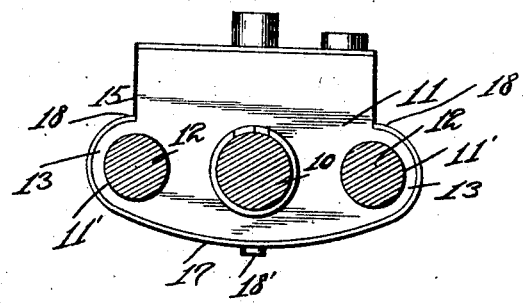
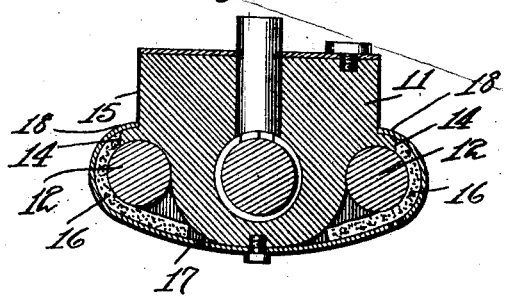
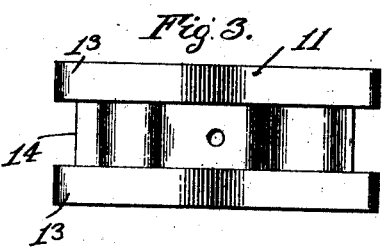
Inventor
Nicholls J Smith.
By
Attorney Patented Feb. 10, 1925.

1,525,669

UNITED STATES PATENT OFFICE.

NICHOLLS J. SMITH, OF BAINBRIDGE, GEORGIA.

FISHING REEL.

Application filed September 16, 1924. Serial No. 738,055.

*To all whom it may concern:*

Be it known that I, NICHOLLS J. SMITH, a citizen of the United States, residing at Bainbridge, in the county of Decatur, State of Georgia, have invented certain new and useful Improvements in Fishing Reels; and I do hereby declare the following to be a full, clear, and exact description of the invention, such as will enable others skilled in the art to which it appertains to make and use the same.

This invention relates to new and useful improvements in fishing reels, and particularly to the line guides therefor.

One object of the invention is to provide a novel and improved means for supplying oil to the slidable line guiding block.

Another object is to provide an oiling device for the line guiding blocks of fishing reels wherein it is easy to replenish the supply of oil to the oiling device.

Another object is to provide a line guiding block which is formed to retain an absorbent material, and means for retaining such absorbent material in contact with the guide rods of the reel.

Other objects and advantages will be apparent from the following description when taken in connection with the accompanying drawing.

In the drawing:

Figure 1 is a side elevation of the line guiding block and the threaded shaft and guide rods or shafts in section.

Figure 2 is a vertical longitudinal central sectional view through the guiding block.

Figure 3 is a bottom plan view of the block.

Referring particularly to the accompanying drawing, 10 represents the threaded shaft on which the guiding block 11 is mounted, and by means of which said block is moved. This shaft 10 is disposed transversely through the intermediate portion of the block, and formed through the end portions of the block are the openings 11, through which the guide rods 12 are disposed, and on which rods the said block slides. It is at the points of contact between the block and these rods 12 that the lubrication is necessary to the easy and successful movements of the block.

It will be noted that the ends of the block are bulged out at 13, where the guide rod openings 11 are formed. The intermediate portions of these bulges 13 are cut out at 14, and are continued inwardly with the upper walls 15 inclining downwardly toward the center of the lower face of the block. Engaged around each of the rods 12, within the cut out portions 14, are the pieces of absorbent material, such as the felt 16, said pieces being adapted to be saturated with oil, so as to distribute the oil on the rods, and thereby render the sliding movements of the block easy. A strip of metal 17, having its ends curved inwardly from the same side of the plate, toward each other, as shown at 18, is disposed to cover the bottom of the block, with its curved ends embracing the said bulged ends of the block. This plate is secured to the block in any suitable manner, as by the screw 18. Suitable openings may be formed, wherever necessary or convenient, to permit renewing the supply of oil to the felt wicks or pieces 16.

What is claimed is:

1. The combination with the driving shaft and guide rods of a fishing reel, of a block operatively engaged with the shaft and having recesses in one face thereof, the side walls of the recesses having transversely alined openings, said guide rods being slidably received in the alined openings and traversing the recesses, lubricating means within the recesses and engaged with the rods, and means engaged on the block for pressing the lubricating means against the rods.

2. The combination with the driving shaft and guide rods of a fishing reel, of a block operatively engaged with the shaft and having recesses in the ends of its lower face, the side walls of the recesses having alined openings transversely of the block, said rods being disposed through the alined openings and transversely through said recesses, lubricant carrying wicks disposed against the rods within the recesses, and retaining means on the block engaging with the wicks to press the same into contact with the rods.

3. The combination with the driving shaft and guide rods of a fishing reel, of a block operatively engaged with the drive shaft and having outwardly projecting end portions within the lower faces of which are formed recesses, the side walls of said recesses having openings alining transversely of the block and recesses, the said rods being slidable through the alined openings and through the recesses, lubricant carrying wicks partially encircling the rods within the recesses, and a retaining plate covering the recesses and bearing against the wicks to press the same into contact with the rods, the ends of the plate being resiliently engaged with said projecting portions of the block.

In testimony whereof, I affix my signature, in the presence of two witnesses.

NICHOLLS J. SMITH.

Witnesses:
C. G. HOLDER,
J. J. WALTERS.